US008767076B2

(12) United States Patent
Hall et al.

(10) Patent No.: US 8,767,076 B2
(45) Date of Patent: Jul. 1, 2014

(54) SYSTEMS AND METHODS FOR TESTING VIDEO HARDWARE BY EVALUATING OUTPUT VIDEO FRAMES CONTAINING EMBEDDED REFERENCE CHARACTERISTICS

(75) Inventors: Wally E. Hall, Centennial, CO (US); Micah Moore, Windsor, CO (US); Michael Carlton Harden, Arvada, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 13/486,956

(22) Filed: Jun. 1, 2012

(65) Prior Publication Data

US 2012/0307076 A1      Dec. 6, 2012

Related U.S. Application Data

(60) Provisional application No. 61/493,043, filed on Jun. 3, 2011.

(51) Int. Cl.
*H04N 17/00* (2006.01)
*H04N 17/02* (2006.01)

(52) U.S. Cl.
USPC ............................ 348/193; 348/192; 348/181

(58) Field of Classification Search
USPC .......................... 348/590–593, 189, 192, 193
See application file for complete search history.

(56) References Cited

U.S. PATENT DOCUMENTS

| 5,838,310 A * | 11/1998 | Uya ................................ 345/536 |
| 6,493,035 B1 | 12/2002 | Nishikawa et al. |
| 2003/0081124 A1 | 5/2003 | Balasubrawmanian et al. |

FOREIGN PATENT DOCUMENTS

| EP | 0896483 A2 | 2/1999 |
| EP | 2302934 A1 | 3/2011 |
| WO | 2007053538 A2 | 5/2007 |
| WO | 2008064388 A1 | 6/2008 |

OTHER PUBLICATIONS

European Patent Office, International Searching Authority, "International Search Report and Written Opinion" mailed Jul. 24, 2012 for International Appln. No. PCT/US2012/040549, filed Jun. 31, 2012.
European Patent Office, Communication Pursuant to Rules 161(1) and 162 EPC, dated Jan. 14, 2014 for European Patent Application No. 12726328.3.

* cited by examiner

*Primary Examiner* — Michael Lee
(74) *Attorney, Agent, or Firm* — Ingrassia Fisher & Lorenz, P.C.

(57) ABSTRACT

Methods and apparatus are described for assessing the video image decoding quality of a set top box (STB), television receiver or other video device. Moving video testing of video delivery hardware in a manufacturing environment uses a video sequence that has reference characteristics embedded in the visible portion of the video signal from frame to frame. Each frame of the video is analyzed for distortions of the embedded reference objects, and the reference objects are allowed to move from frame to frame. The reference objects are located through the use of a background that is easily discriminated from the objects and by the use of frame templates that locate the reference information in the frame.

20 Claims, 12 Drawing Sheets

SYSTEMS AND METHODS FOR TESTING VIDEO HARDWARE BY EVALUATING OUTPUT VIDEO FRAMES CONTAINING EMBEDDED REFERENCE CHARACTERISTICS

PRIORITY

This application claims priority to U.S. Provisional Patent Application Ser. No. 61/493,043 which was filed on Jun. 3, 2011. This application is incorporated herein by reference.

BACKGROUND

Various types of devices are used to decompress, decode and/or otherwise reproduce video programming content. A conventional set top box (STB), for example, typically decodes video signals received from a cable, direct broadcast satellite (DBS) or other broadcast source for presentation to a viewer on a television or other display. Other devices that provide video reproduction include other types of broadcast television receivers, as well as televisions and video displays themselves, video cards, video processing circuitry, computers, and many others.

Generally, it is desirable to verify that manufactured video reproduction devices are functioning properly during before the devices are shipped to the customer or distributor. Often, human subjective testing is used to evaluate video encoding and decoding robustness during the design process, and to ensure quality and proper functioning after manufacturing. Particularly in the manufacturing arena, human subjective testing can be relatively labor intensive and expensive. Moreover, human testing is inherently susceptible to variations in subjective human review standards, thereby potentially leading to a range of quality fluctuations that can be quite difficult to normalize or control.

Although several types of automated testing schemes have been developed, each of the known techniques exhibits one or more disadvantages in practice. One type of automatic picture quality analysis, for example, uses machine vision to capture a portion of a pre-recorded video test sequence that is displayed in response to the system under test. The captured portion of the display is analyzed using digital signal processing hardware, and a more objective (e.g., numeric) "picture quality rating" is produced based upon spatial, temporal, color and/or other analysis. Problems can arise, however, with straightforward comparisons of test and reference sequences to generate the quality metrics. Spatial or temporal misalignments between test and reference sequences, for example, can greatly affect such measurements, leading to inaccuracies. Further, temporal artifacts (e.g., repeated frames taking the places of lost original frames) can occur due to transmission errors, buffer overflow or underflow, or other factors, thereby interfering with the results of the analysis. Other issues could also arise, leading to uncertainty, inaccuracy and/or variation in the "objective" metric determined by a machine-vision system.

As a result, it is desirable to create systems, methods and/or devices that are able to effectively yet efficiently test video decoding hardware such as set top boxes, video receivers and/or the like. Various features and characteristics will become apparent from the subsequent detailed description and the appended claims, taken in conjunction with the accompanying drawings and this background section.

BRIEF SUMMARY

Various embodiments provide methods and systems to test video hardware such as set top boxes, televisions, and the like.

According to various exemplary embodiments, a method is provided to identify video decoding errors produced by a video device. The method suitably comprises receiving an output stream of motion video from the video device and processing each of the output frames with a video analyzer device. The output stream suitably comprises a plurality of output frames each produced by the video device in response to a predetermined input, and each of the plurality of output frames comprises a frame identifier and at least one object presented on a consistent background. For each of the plurality of output frames, the analysis involves associating the output frame with a frame template based upon the frame identifier, wherein the frame template defines an expected location of the at least one object within the output frame. The analysis also involves verifying that a plurality of pixels lying within the output frame and outside of the expected location of the at least one object conform to the consistent background.

Other embodiments may provide a system to identify video decoding errors produced by a video device under test that comprises a video digitizer and a frame analyzer comprising a processor. The video digitizer is configured to receive an output stream of motion video from the video device under test, wherein the output stream comprises a plurality of output frames each produced by the video device in response to a predetermined input, and wherein each of the plurality of output frames comprises a frame identifier and at least one object presented on a consistent background. The frame analyzer is configured to associate, for each of the plurality of output frames, the output frame with a frame template based upon the frame identifier, wherein the frame template defines an expected location of the at least one object within the output frame. The frame analyzer is further configured to verify that a plurality of pixels lying within the output frame and outside of the expected location of the at least one object conform to the consistent background, and to provide an output that indicates when pixels lying within the output frame and outside the expected location of the at least one object do not conform to the consistent background.

These general embodiments may be modified or supplemented in many ways, as described more fully below.

BRIEF DESCRIPTION OF THE DRAWING FIGURES

Exemplary embodiments will hereinafter be described in conjunction with the following drawing figures, wherein like numerals denote like elements.

DETAILED DESCRIPTION

Figure 1:
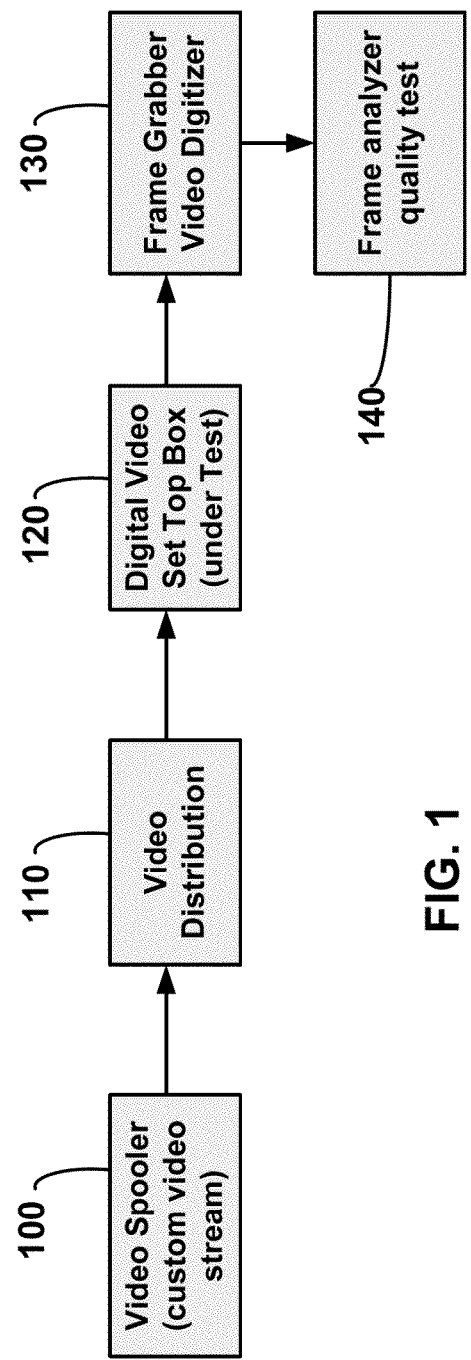
FIG. 1 shows a block diagram of the hardware pieces involved in an exemplary embodiment.

The following detailed description is merely exemplary in nature and is not intended to limit the invention or the application and uses of the invention. Furthermore, there is no intention to be bound by any theory presented in the preceding background or the following detailed description.

According to various exemplary embodiments, the device under test is directed to generate a stream of motion video that represents a known sequence of test frames. Each of the test frames is made up of an identifier, one or more displayed objects that may move from frame to frame, and a suitable background. Each test frame is decoded and reproduced at the output of the device under test, and the output is provided to a frame analyzer or the like for analysis and comparison to an expected result. In many implementations, errors in the device under test are identified when one or more output pixels that are expected to be part of the image background are in fact different from the other background pixels. This condition typically results if one or more of the image objects distorts to overlap a portion of the background.

In various embodiments, the background is consistent in color (e.g., white) and in pixel intensity (e.g., on the order of 90% or so of maximum intensity) so that the background is relatively unchanging throughout the entire frame. The reproduced video frames can then be analyzed to determine if any artifacts from the displayed moving objects have "smeared" or otherwise distorted into the otherwise consistent background.

Further, the number and the content of the frames can be controlled to make frame analysis more efficient. Each of the test frames suitably includes a frame number or other identifier, for example, that is contained within the frame imagery, and that can be used to identify the frame during subsequent processing. Using this identifier, the analyzer is able to associate the output frame with a template or other description of the frame that allows the analyzer to know the desired locations of objects displayed in the frame. The locations of objects within the test frame may be defined directly (e.g., by describing the positions of the objects), indirectly (e.g., by describing the positions of the background outside of the objects), or otherwise as desired.

The analyzer therefore receives actual output signals from the device under test that represent decoded or otherwise reproduced video frames based upon a known input. The received frames can then be compared to known templates or other information about each frame to readily identify any discrepancies.

More particularly, the analyzer suitably checks an appropriate set of pixels within the received frame data to determine if any "smearing" of the moving objects has occurred. In various embodiments, the analyzer evaluates a subset of pixel rows and/or columns to ensure that the scanned pixels are consistent with the common background. Pixels corresponding to moving objects within the frame can be identified from the frame template, and ignored (or otherwise processed) as desired.

The various parameters of the analysis may vary significantly from embodiment to embodiment, and may be selected so that real-time (or near real-time) analysis of the video output can be performed. By designing a consistent monochromatic background, for example, the various pixels may be analyzed using simple monochromatic sampling techniques, such as eight-bit monochromatic sampling. If any analyzed pixel differs in intensity from the expected value of the consistent background, then an issue can be identified relating to that pixel. Pixels that are evaluated in each frame may be selected in any manner, as described more fully below. Analysis of multiple pixels may be combined in any manner; multiple pixel values from a common row, column or other portion of the image could be summed and/or averaged, for example.

Various embodiments therefore provide an approach to evaluating video output from a video decoder device such as a set top box or video terminal that includes one or more video outputs. Generally speaking, the input video test stream provided to the device under test contains embedded references that can be used to determine video errors or quality. Video errors can typically occur because of missing information and/or issues with the decoding itself. Examples of different types of video errors could include macro block errors, wrong colors or brightness, motion vector errors resulting from blocks of information located in the wrong place, and/or other errors as appropriate.

The attached drawing figures and the following text describe at least one exemplary implementation. Various other embodiments may differ substantially from the examples set forth herein.

With reference now to the drawing figures, FIG. 1 depicts an exemplary video quality test system where a custom video test stream or frame sequence resides on a video spooler 100 or the like. This custom video signal may be encoded and modulated in any standard or proprietary format (e.g., MPEG 2, MPEG 4, Quicktime, H.264, Windows Media, Flash Media and/or the like) that can be decoded or otherwise reproduced on the device under test 120. The input signal is distributed or otherwise provided to the device under test 120 using a video distribution 110. The video distribution no routes or otherwise provides the signal to a device under test 120 in any manner. Equivalently, the video distribution 110 may be provided on a non-transitory digital storage medium such as a digital disk, a digital memory, or the like. The input signal typically encodes content that is structured and formatted in a predetermined manner to produce predictable results if the device under test 130 is performing normally, as described more fully below.

Device under test 120 may represent a set top box (STB) or other television receiver, or any other device capable of decoding or otherwise reproducing digital or analog video signals, such as a television, video display, video processing chip or card, computer system, video game system, media player and/or the like. The device under test 120 may also be referred to herein as a video terminal, or simply "video device".

The video outputs from the device under test 120 are appropriately input to a device such as a video frame analyzer 130 (e.g., a frame grabber video digitizer). The video frame analyzer 130 may contain a buffer or other memory in the form of RAM, disk space and/or the like to store reference information and/or templates regarding each frame, as well as one or more of the received video frames themselves. The video output from the device under test 120 may be received in any analog formats (e.g., composite, component, S-Video and/or the like) and/or any digital formats (e.g., HDMI, DVI and/or the like). The video frame analyzer 130 typically digitizes one video frame at a time, although other embodiments may digitize multiple frames as appropriate. Digitizing typically involves breaking each pixel into a three-space value, such as Red-Green-Blue or Y—Pr—Pb, as appropriate. A frame analyzer quality test 140 then analyzes the frame pixel components to determine the frame quality. In various embodiments, video frame analyzer 130 and quality tester 140 may be implemented using a general purpose computing system (e.g., a personal computer) that includes an appropriate hardware and software interface (e.g., a video interface card) for receiving video signals output from the device under test 120. A personal computer running a conventional frame grabber card, for example, could receive and digitize output video signals from the device under test 120. Software executing on the personal computer (or another computer) could then analyze the received and digitized images from the received signal.

As noted above, pixels are normally defined with respect to three component values such as Red, Green and Blue (RGB). When a pixel value is referred to, then, this can mean the sum of the red, green and blue values, as appropriate. "Pixel value" could also refer to the level of the individual pixel components as compared to each other in the individual color space (for example, RGB). "Pixel value" may have other meanings in other embodiments, as described more fully below.

Figure 2:
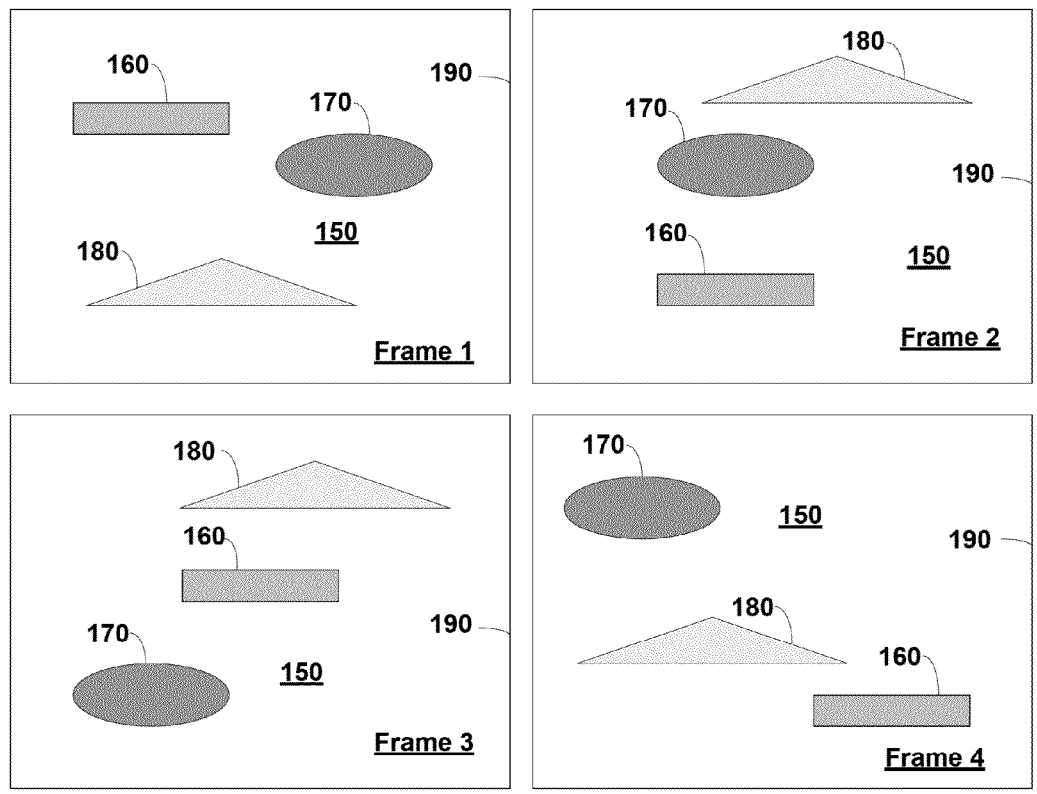
FIG. 2 shows an example of objects moving within a frame but maintaining a constant average of the video.

FIG. 2 shows an example in which references are embedded into the video signal itself. In this figure, four frames (all 190) are shown, and within each frame are three objects: a rectangle 160, an oval 170, and/or a triangle 180. Each of the four frames in this example contains the same exact objects 160, 170, 180 except that the objects have moved from frame to frame. Also, each frame has a background 150 that, in this case, has a consistent background color and intensity over the entire frame (except where the objects are). Color and brightness are also consistent from frame to frame, although some deviation in color and/or brightness may be tolerated in some embodiments.

One reference embedded into each frame as shown in the example of FIG. 2 is that the average value or sum of the pixel values for all the pixels included in the objects 160, 170, 180 remains constant from frame to frame. Extending this further and ignoring the constant color and amplitude pixels in background 150, the average (or sum) of the pixel values for all of the pixels in the objects 160, 170, 180 would remain constant from frame to frame in this example. Also, the total number of pixels that are not the same value as the background should be the same in each frame if no errors have occurred. In one embodiment, the frame analysis could ignore all pixels that are the same amplitude as the background 150. The remaining pixels that are different than the background would therefore represent the objects 160, 170, 180. The sum or average of all the non-background 150 pixels could then be summed and/or averaged to determine a total or average pixel value for the non-background pixels. If no errors occur, then this total or average should not change between the four frames shown in FIG. 2. The total number of non-background pixels could also be tracked as a further check.

If an error occurs in the frame, this will typically change both the average of all the non background 150 pixels and the total number of non-background pixels in background 150. A digital blocking error, for example, would typically produce one or more pixel values that are not the same as the background 150, so this would be readily detectable. Also, because the background pixels 150 are being ignored in this example, the magnitude of the error is only compared to the objects 160, 170, 180. In effect, this example would increase the error-to-object-pixels ratio, thereby resulting in more accurate error detection.

In the example of FIG. 2, the concept of throwing out the background pixel from the average pixel analysis was introduced. If it is assumed that video error pixels will tend to be closer to black level than white level, this difference can be exploited by designing the background pixel value to be closer to white level than black. In one embodiment, the background level could be designed to be about 90% white or so, although any color or amplitude level could be used in other embodiments. In conventional monochrome parlance, a white pixel is generally considered to be at full scale and a black pixel is considered at zero level. By designing the level of the background to be consistent across the frame and then ignoring the background value from the expected average pixel value in this example is, in a sense, giving the background of near-white pixels a near-zero value, in terms of its effect on the average pixel value.

Figure 3:
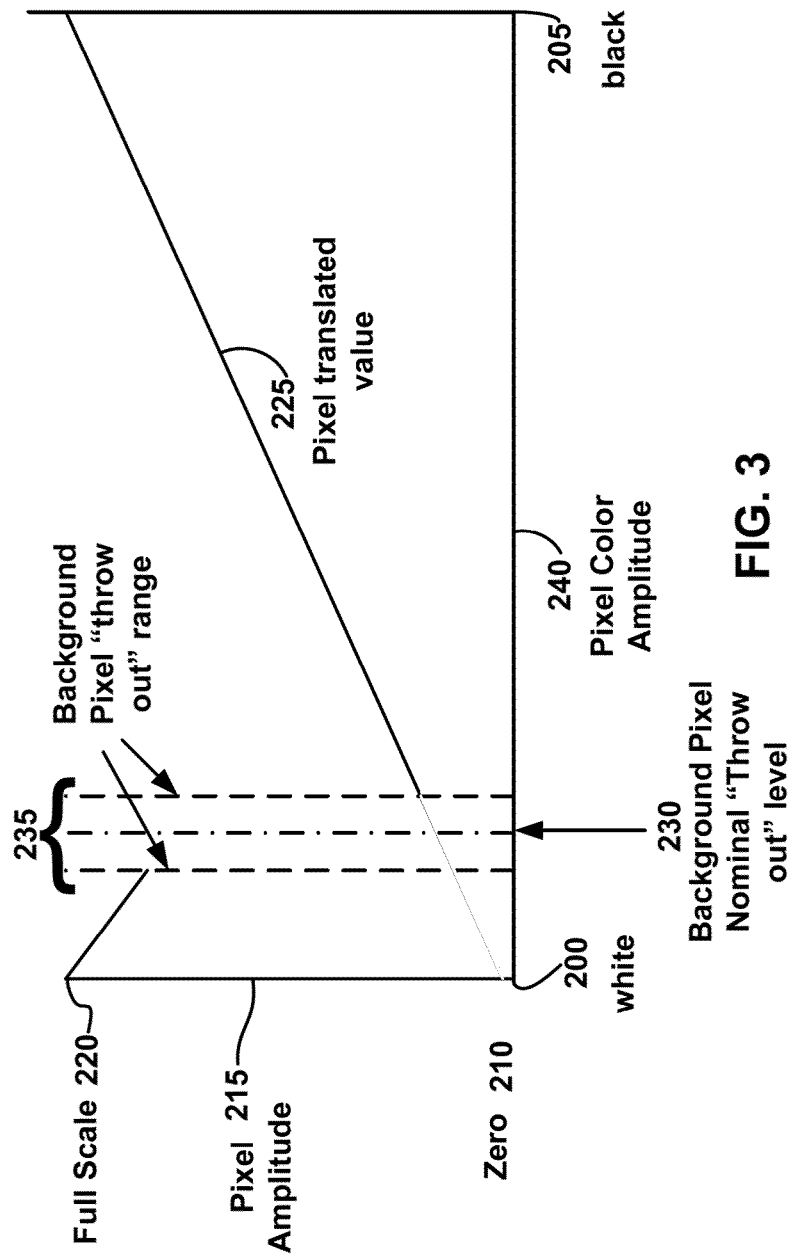
FIG. 3 shows an exemplary pixel value translation method.

FIG. 3 shows an example of a value translation function that could be used for the pixel average value summation. In the pixel analysis, a section of the frame 190 could be designed with an area that is consistently part of the background 150 and that has no objects 160, 170 or 180. The "background pixel nominal throw out level" 230 can then be quickly determined by looking in this area that maintains a constant background. A tolerance (e.g., +/−2 percent in this example, other embodiments may use other values) sets a high and low pixel level for the background pixel throw out range 235. Pixels with pixel values occurring within this range 235, then, could be assumed to be part of background 150.

The background 150 could also have some sort of texture in some embodiments. For example, the background texture could vary in a periodic or other predictable manner in the horizontal (and/or vertical) dimension such that the process of looking for the background could be compensated in an equivalent and in-phase manner.

When the pixels in the frame 190 are examined in this example, any pixel encountered in the background pixel throw out range 235 can be assumed to be part of the background 150 and therefore discarded. To emphasize the effects of any errors that might occur, pixel values occurring outside of the discarded range may be amplified in accordance with their difference to the background 150 in further analysis. If a pixel value is less than the lower background pixel throw out range 235, for example, FIG. 3 shows that the value is translated by a simple formula:

Translated value=Full Scale−measured value

An example of a curve 225 for translated pixel values is shown in FIG. 3. One can see that a black colored pixel would normally have a small pixel value (corresponding to its dark color), but the translated value is at or near full scale. This pixel translation gives higher weighting to darker pixels in the average or sum of all pixels, thereby emphasizing the deviation from the background range 235.

Normally objects 160, 170, 180 would not be designed to have pixels at pixel amplitudes that are more white than the background 150. Video errors, however, can still occur in the white range. If a pixel is encountered that has a higher pixel value than the high side of the background pixel throw out range 235, then FIG. 3 shows that this pixel value is not translated and is just applied toward the sum or average. This gives a high weighting to very white pixel errors in this example.

Figure 4:
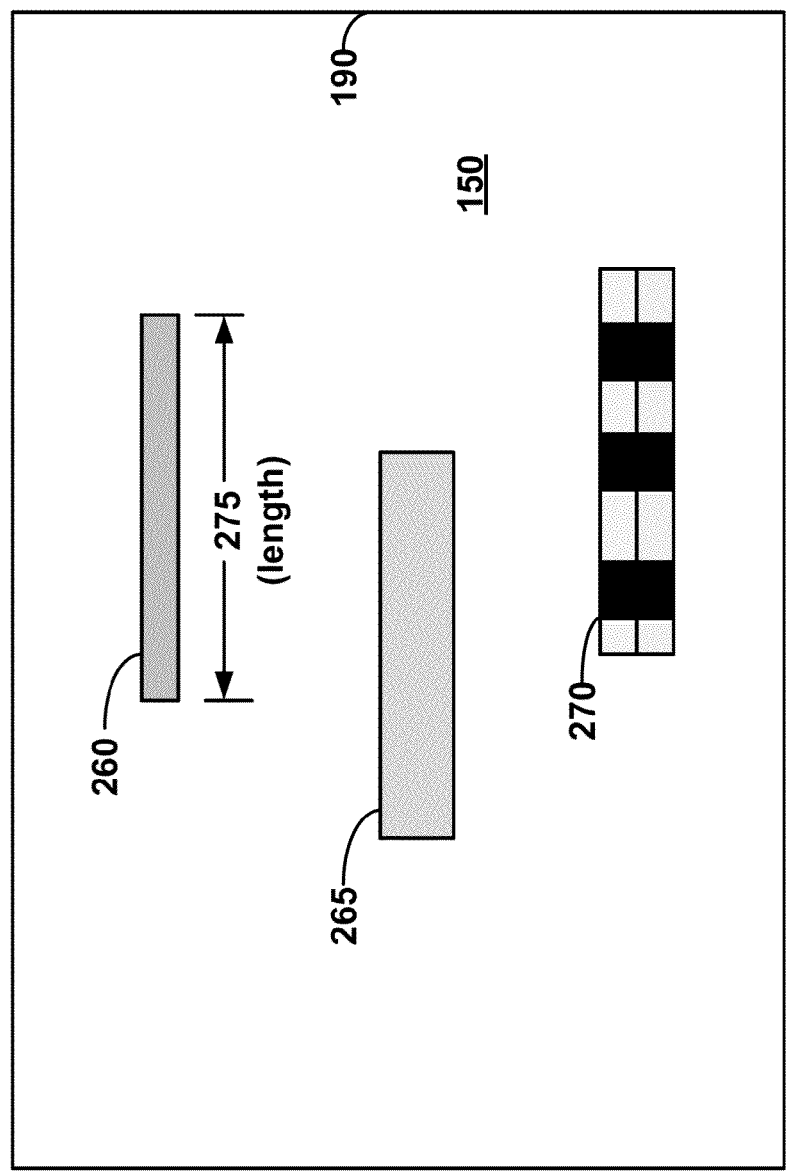
FIG. 4 shows another example of objects that can move in a frame and that are used for an exemplary minimum length object test.

FIG. 4 shows another frame 190 with three objects 260, 265 and 270. All three of these objects have horizontal borders and also are horizontally of the same length 275. As before, there is a constant color and amplitude background 150. As shown previously, these three objects can change position from frame to frame, but their size, color and texture remains constant for all frames such that the property of constant average video level is preserved from frame to frame. In the example of FIG. 4, three objects 260, 265 and 270 are shown. Other embodiments could include be more or fewer objects in the frame as long as the same objects are in all frames. Note that in this example object 270 has additional definition compared to objects 265 and 260. This is acceptable for the object in this example as long as either the object retains the same shape and definition in each frame of the video or the average value of the pixels in the object remain constant.

Figure 5:
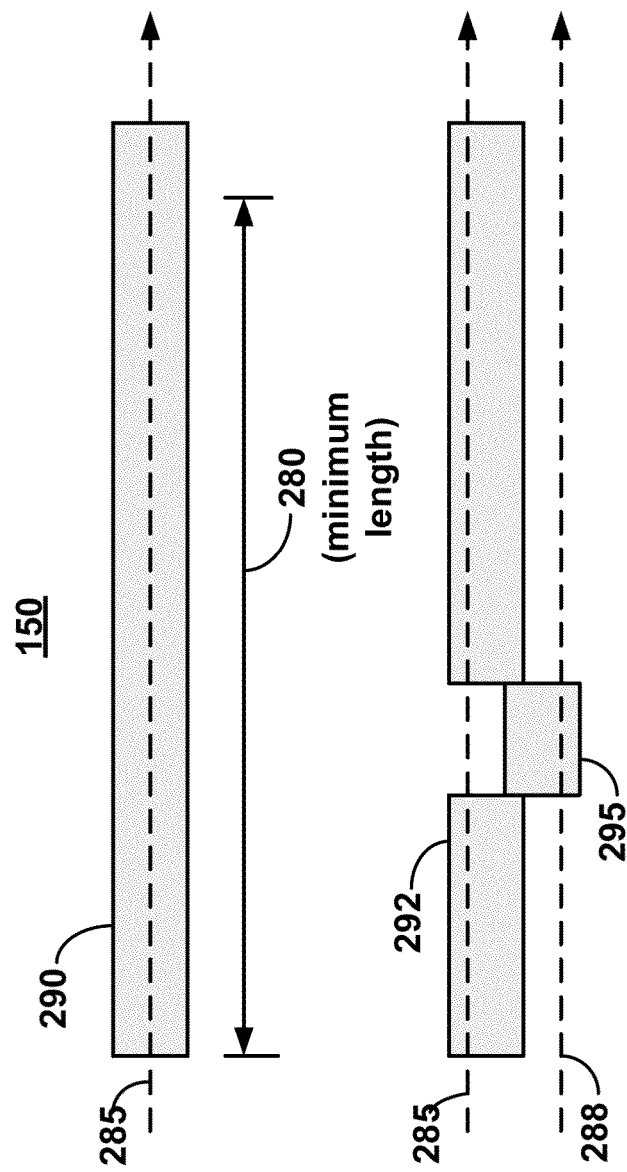
FIG. 5 shows an exemplary object illustration minimum length object and an exemplary method for detecting errors.

FIG. 5 shows an additional exemplary quality test that can be done on the constant length objects such as 260, 265 and 270. In FIG. 5, exemplary object 290 is presented, and a minimum length 280 is defined where a line scan 285 (e.g., a scan of pixels that are arranged in a line) will see non-background pixels continuously. In the illustrated example, the line scan 285 would start from the left side of the object 290. Initially in the scan, only the background 150 is encountered and as described earlier, the background pixels are ignored or thrown out. As soon as the object 285 is encountered, the pixels are included in the sum/average and number on non-background pixels analysis.

In the lower part of the example illustrated in FIG. 5, an error is shown where a block 295 of the object 292 has been vertically misplaced. This can be caused by a motion vector error, for example. If this occurs, scans along both lines 285 and 288 will see shorter sections of non background pixels. We can see that scan 285 will see two non-background sections of the object in this instance, and both of these sections are shorter than the expected minimum length 280. We can also see that the line scan 288 that encounters the section 295 will also have a horizontal length of non-background pixels that is shorter than the expected minimum length 280. This concept of minimum length of an object can be further used to find displacement errors such as the block 295. By counting the number of contiguous non-background pixels that are encountered during a line scan, then, and comparing this count against a minimum number of expected pixels, errors can be identified when background pixels are encountered sooner than expected.

Figure 6:
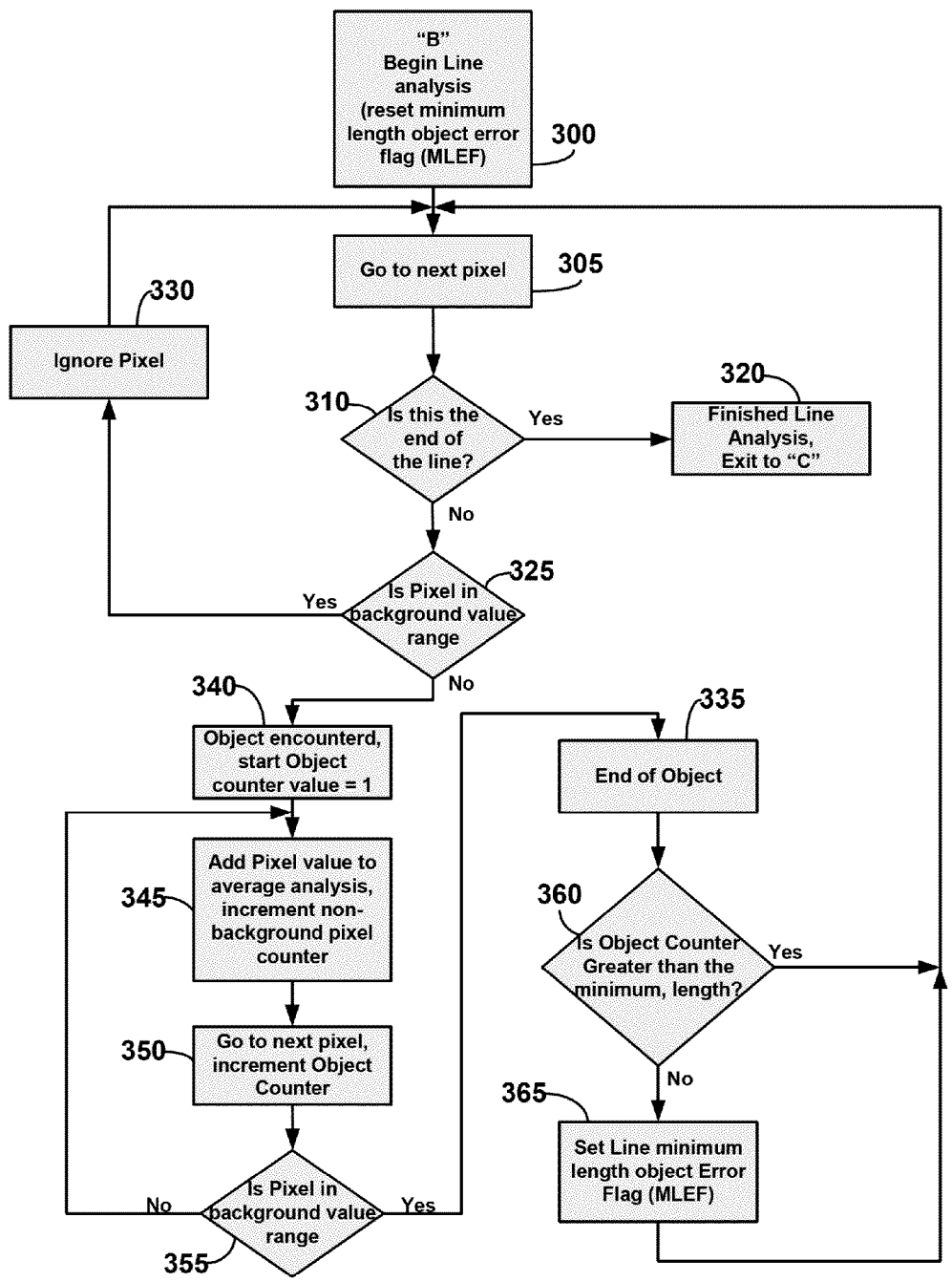
FIG. 6 shows an exemplary process flow for line by line analysis.

FIG. 6 shows a flowchart of an exemplary process for performing a line scan (such as a scan along line 285 in FIG. 5). This process could be implemented within a general or special purpose computer system using any sort of conventional hardware and software, including any sort of processor and memory or other non-transitory storage.

The line analysis in this example starts at "B" (300) where a minimum length error flag (MLEF) is initially reset. In function 305, the pixel pointer is incremented to look at the next pixel in the scan line. This value may be initially set to zero, so incrementing the zero value points toward the first pixel in the scan line. Function 310 looks to see if the line has been completely examined yet and if so, the analysis exits at point "C" 320. In function 325, the current pixel values are examined to see if the pixel is in some pre-determined range of the frame background 150 (e.g., range 235 of FIG. 3). If yes, the pixel is ignored in function 330 and the process loops around back to function 305 where the next pixel is examined in the same method.

If a pixel is not determined to be background in function 325, it can be determined that an "object" such as 290 has been encountered and an object counter is initiated as shown in function 340. In this illustration, a starting value of "1" is used although other embodiments could use other equivalent representations. The pixel value of this pixel then gets added to the sum/average analysis derived from the sum of the pixel values of all non-background pixels; the pixel value may be scaled, as discussed above with respect to FIG. 3. The non-background pixel count is also incremented, as appropriate.

In function 350, the next pixel is looked at and also the object counter is incremented. The new pixel is then again evaluated to see if it is background and if it is not, the process loops back to function 345 and continues to look at pixels in the object and to add pixel values to the analysis when appropriate pixels are encountered.

If a background pixel is encountered in function 355, this signals the end of an object and the flow goes to function 335. In function 360, the object counter value is compared to a predefined minimum length number. For example, the minimum length could have been defined as 100 pixels. If the object counter was only 20 pixels, the minimum length test in function 360 would have failed and the process goes to function 365 where a Minimum Length object Error Flag (MLEF) is set to indicates that in the line scan, an object was encountered which did not meet the minimum length test. If the object was greater than the minimum length in function 360, the process flow jumps back to function 305 where the line is continued to be scanned and analyzed until the line is scan is finished in function 310.

Note that more than one minimum length object error could be encountered in a line scan. In the exemplary process shown in the example of FIG. 6, this will only set the minimum length error flag one time but this could also be set up to where the number of minimum length errors are passed out of the process.

Again, FIG. 6 shows one exemplary process; any number of alternate embodiments may adapt this process or use completely different processes, as desired.

Figure 7:
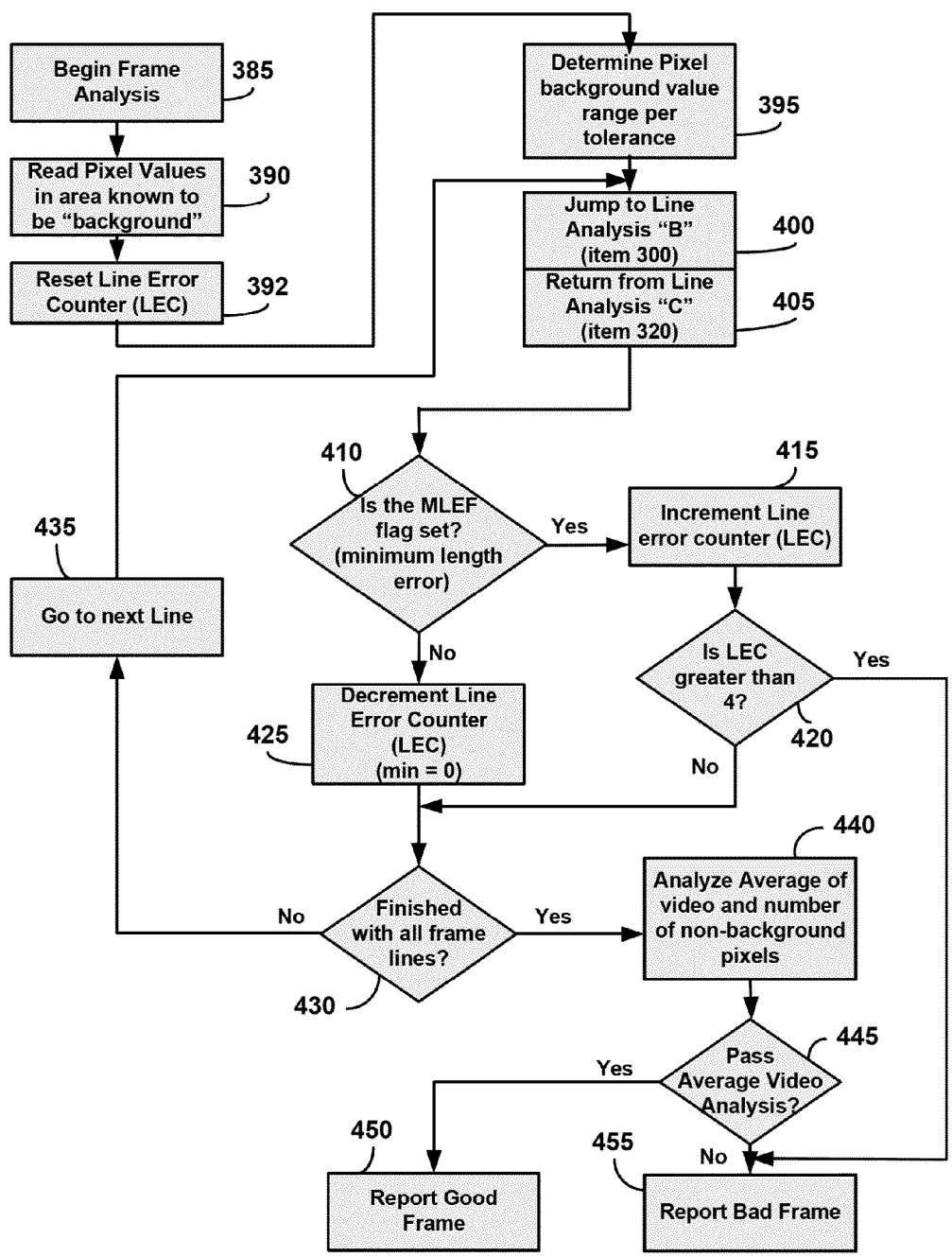
FIG. 7 shows an exemplary process flow for frame analysis.

FIG. 7 shows an exemplary process for analyzing video output received from a frame grabber, digitizer 130 or the like. This process may be implemented using a general or special purpose digital computer 140, such as a personal computer or the like. The technique may be implemented using computer-executable instructions that are stored on any non-transitory storage medium (e.g., a memory, disc or the like) and that are executed by any sort of processor, controller, or other hardware as appropriate.

FIG. 7 shows that the process begins at function 385. Function 390 initially analyzes one or more pixels values in a portion of the frame that is known to have only background intensity pixels, as described above, so that the background pixel level 230 (FIG. 3) can be determined. The Line Error Counter LEC is reset or otherwise initialized as appropriate in function 392.

In function 395, the background pixels which were read in function 390 are now analyzed for an average value and also a predetermined tolerance (e.g., range 235 in FIG. 3) is used to determine the range of pixels that will be determined to be background 150. For example, if the background pixels are 90% white and the tolerance is 2%, the tolerance for background pixels would be 88% to 92% white level. Any background level or tolerance could be chosen in any number of alternate embodiments. Also, in embodiments wherein the background level is known and unchanging, the levels and tolerances may be "hardcoded" into the process, thereby reducing or eliminating the need to individually detect the background values for one or more frames.

Each video frame received from the video grabber/digitizer 130 is processed as appropriate. In various implementations, the line scan process described above with respect to FIG. 6 may be incorporated to analyze each frame. Function 400 of FIG. 7, for example, shows that processing jumps to point "B" in FIG. 6 and returns from "C" in FIG. 6 as function 405. Both B and C are defined in FIG. 6 as function 300 and function 320, respectively.

After returning from the line scan in function 405, the process checks to see if the MLEF (minimum length error flag) is set in function 410. If the flag is set, this indicates that a minimum length error occurred and the line error counter LEC is incremented in function 415. In function 420, the LEC is checked against an appropriate predetermined value. In function 420, this is shown as "four" (indicating that four errors may be tolerated) but any number of errors could be used for other analysis. In this case, the process would goes to function 455 and reports a bad frame when the line error count exceeds the threshold ("4") value. Using the LEC and a number requiring a number of lines with minimum length errors allows the objects such as 285 to have somewhat jagged horizontal edges without a false failure. Other embodiments may check for tighter tolerances, as desired.

If the LEC test in function 420 is less than the threshold value, the process goes to function 430 where it is determined if all of the lines in the frame have been analyzed. If yes, the process goes to function 440. At this point, the line scans are all complete and any non-background pixel has had its pixel value added to a sum or average. Also, the count of non-background pixels has been accumulated and kept. The sum/average and the number of non-background pixel counts are each compared to known reference numbers that can be designed to remain constant for all frames, as described above. An exemplary embodiment may be designed such that, say, 640 non-background pixels are expected to be counted. A tolerance of +/−3% (or any other desired value) could be set around this number, which would result in the frame "passing" if the non-background pixel count is 621 to 659 in this example. If the frame is determined to be good, a good frame is reported in function 450. If the frame is bad, a bad frame is reported in function 455.

If the MLEF flag is not set in function 410 (indicating that the line just scanned did not have any minimum length errors), the LEC counter can be decremented in function 425 without letting the counter go below zero. Function 425 is an optional step, however, that could be replaced by a variety of processes depending on how blocking errors occur for a given video system.

Function 430 looks to see if all the lines in the frame have been analyzed. If not, the line pointer can be incremented in function 435 and processing continues to function 400 where a new line is looked at.

Again, the process set forth in FIG. 7 is just one example that could be modified or replaced in any number of alternate but equivalent embodiments.

The various functions and features of the processes shown in the drawings figures (e.g., FIGS. 6-7) may be carried out with any sort of hardware, software and/or firmware logic that is stored and/or executed on any platform. Some or all of the processes may be carried out, for example, by logic executing within one or more systems shown in FIG. 1. For example, various functions may be partially or entirely implemented using software or firmware logic that is stored in memory (and/or mass storage) and that is executed by a processor as part of one or more computer systems or other application platforms used to implement frame grabber 130 and/or frame analyzer 140 as shown in FIG. 1. The particular hardware, software and/or firmware logic that implements any of the various functions shown in the figures, however, may vary from context to context, implementation to implementation, and embodiment to embodiment in accordance with the various features, structures and environments set forth herein. The particular means used to implement each of the various functions shown in the figures, then, could be any sort of processing structures that are capable of executing software and/or firmware logic in any format, and/or any sort of application-specific or general purpose hardware, including any sort of discrete and/or integrated circuitry residing in any sort of host system, as desired.

Figure 8:
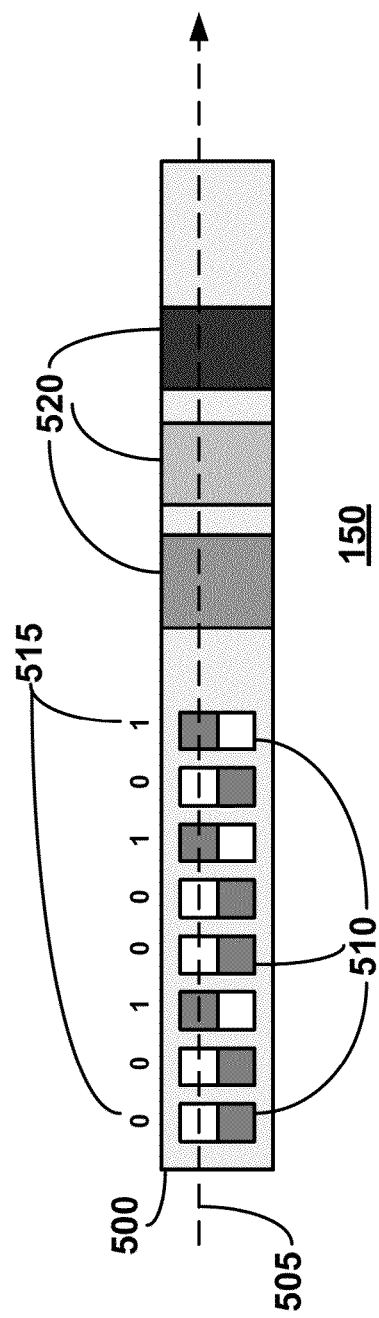
FIG. 8 shows an exemplary object with an embedded binary bit counter and additional reference information.

Continuing to describe an exemplary implementation, FIG. 8 shows an exemplary object 500 that incorporates an eight bit number used as an identifier. In some cases, it is helpful to have an identifier in the frame that numbers the frame. This can be used to determine dropped or added frames in a test process, and can be used to associate the received video frame with the appropriate template or other information about the frame, as desired. To avoid variations between frames, however, it may be desirable to represent each identifier for each test frame using the same types and numbers of pixels. This allows the total/average pixel intensity to remain constant between frames.

One technique for identifying particular frames without inducing pixel intensity variations between frames is illustrated in FIG. 8. In this example, each frame is represented with an eight bit identifier 515 that lies within an object 500. The eight bits making up the identifier in this example are shown by dark and white "bit boxs" 510. The binary representation 515 of the values for the bit boxes 510 are illustrated in FIG. 8 for convenience, although these would not typically be incorporated into the actual imagery provided to the device under test.

In the example of FIG. 8, a horizontal line scan 505 of the object 500 from left to right goes through the first bit box 510 and encounters a white portion of the box. In this example, the white portion could represent a binary "zero" value. The third bit box is dark in the line scan 505, which could represent a binary "one" value. In the object 500 and with the scan 505, we can see that the logic value 515 will be decoded to "00100101". This binary number represents a decimal number of 37. Note that when a bit box 510 changes its binary value, the top and bottom block portions are swapped. This keeps both the average value of all pixels and the number of non-background pixels in the object 500 constant regardless of the binary count represented. In the example shown in FIG. 8, the bit box 510 has 8 bits giving a maximum count of 256. At an approximate frame rate of 30 per second, this would result in approximately 8.53 seconds of video. In one embodiment, we would have a video loop composed of 256 unique frames which repeated approximately every 8.53 seconds. Of course other embodiments could use any number of different frames represented with any number of bits. Other embodiments may use other identifier schemes, as desired.

When the analysis detects a bad video frame based on the tests described, this frame can be saved and the bit box 510 also can be used to tell exactly which frame in a video loop resulted in the error. Also, the binary bit box 510 can be used to adjust the test pass or fail thresholds on a frame by frame basis.

In the embodiment illustrated in FIG. 8, object 500 also includes thre sections 520 that could be used to represent different pixel values. As an example, the three blocks 520 could represent red, blue and green pixel colors. This additional data can also be used by the quality analysis, as desired. For example, the number of "red", "green" and "blue" pixels could be separately tracked and verified in any manner.

Additional embodiments could use a frame identifier object such as the bit box 510 to identify a unique video frame that is also tied to a unique characteristic in an accompanying audio signal. For example, an impulse or square pulse could be inserted in the audio stream as a time identifier at the moment the frame bit box count reached some number. Using the video frame identifier and the audio time identifier, the system can also test for audio and video synchronization.

Another possible embodiment could create a set of frames where each frame has reference objects but the reference qualification of the objects can change from frame to frame. Using a frame identifier object such as object 500, the analysis can apply a frame dependent test on the objects.

Figure 9:
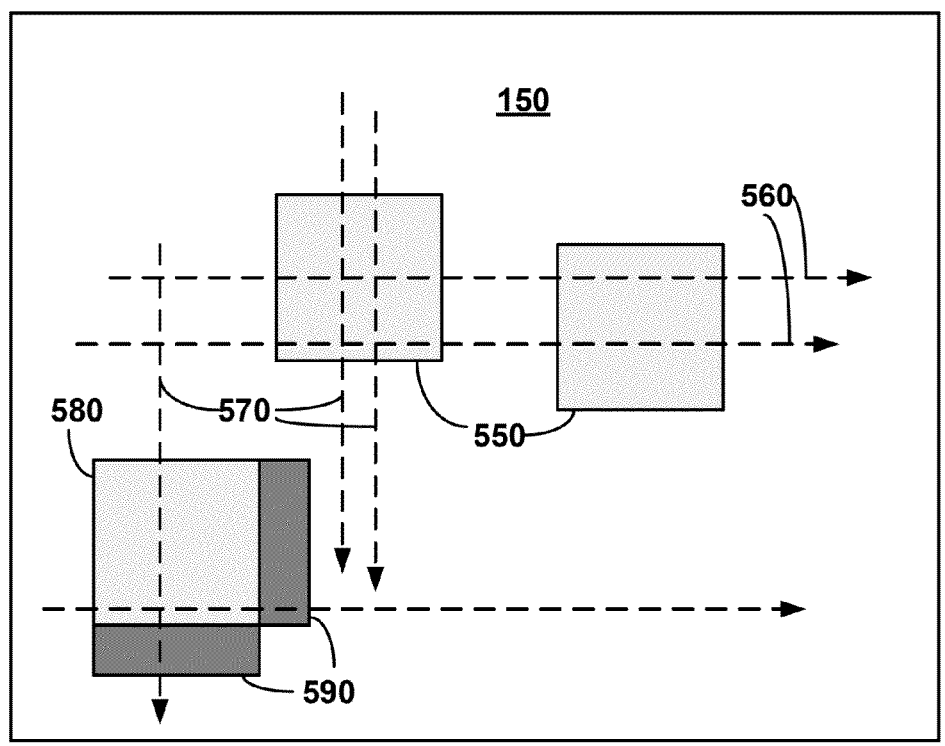
FIG. 9 shows an exemplary embodiment where blocks of known dimension have movement against a constant background.

Another exemplary embodiment could take advantage of decoding errors causing distortion to portions of the displayed image. In this embodiment, objects 550 of known dimension can be placed against a uniform background 150 as shown in FIG. 9. The objects 550 can have motion (change position) from frame to frame and the objects 550 can have as much detail as possible internal to the object boundary. Further, the detail inside the object 550 can change from frame to frame. In a simple exemplary implementation, the detail inside the objects 550 is designed so that it never has any pixel content that is of the same value as the background. The quality of the frame is determined by scanning the frame as noted by the arrows 560 in the horizontal direction and 570 in the vertical direction. Since block internal detail and the background always have exclusive pixel color space values, the physical location of the beginning and end of the block can be found. The linear dimension of the scan length of an object can then be determined to be sure that the length matches a known value, thereby verifying the quality of the image. As an example, an object 550 may be 90 pixels by 90 pixels. A linear scan of a line of a frame which intersects the block object should show that the area of non-background pixels encountered should be approximately 90 pixels in length.

Object 580 in FIG. 9 shows an object distortion as the darker colored areas 590. In this example, the length of non background 150 encountered by the scan would include the distorted area 590, so the length of the non background scanned would be longer than the 90 pixels limit discussed above. This would therefore qualify as a distortion error in this example.

Since distortion 590 can occur in either the horizontal or vertical dimension, the frame scan can also be done in the horizontal and/or vertical dimensions. This is shown in FIG. 9 as the horizontal scans 560 and the vertical scans 570. For example, if the objects 550 and 580 are square and of dimension 90 pixels by 90 pixels, both the horizontal and vertical line scans verify this dimension. Since the analysis is only looking at non-background dimension in this example, this embodiment may not need to maintain a constant average of the pixels from frame to frame. In some cases, we may wish the content inside the object objects to change from frame to frame as a method to stress the digital compression decoding. Having all the objects 550, 580 have the same horizontal and vertical dimension is not critical, then, although it does make the quality detection algorithm simpler since all images are looking for a common qualification length.

Figure 10:
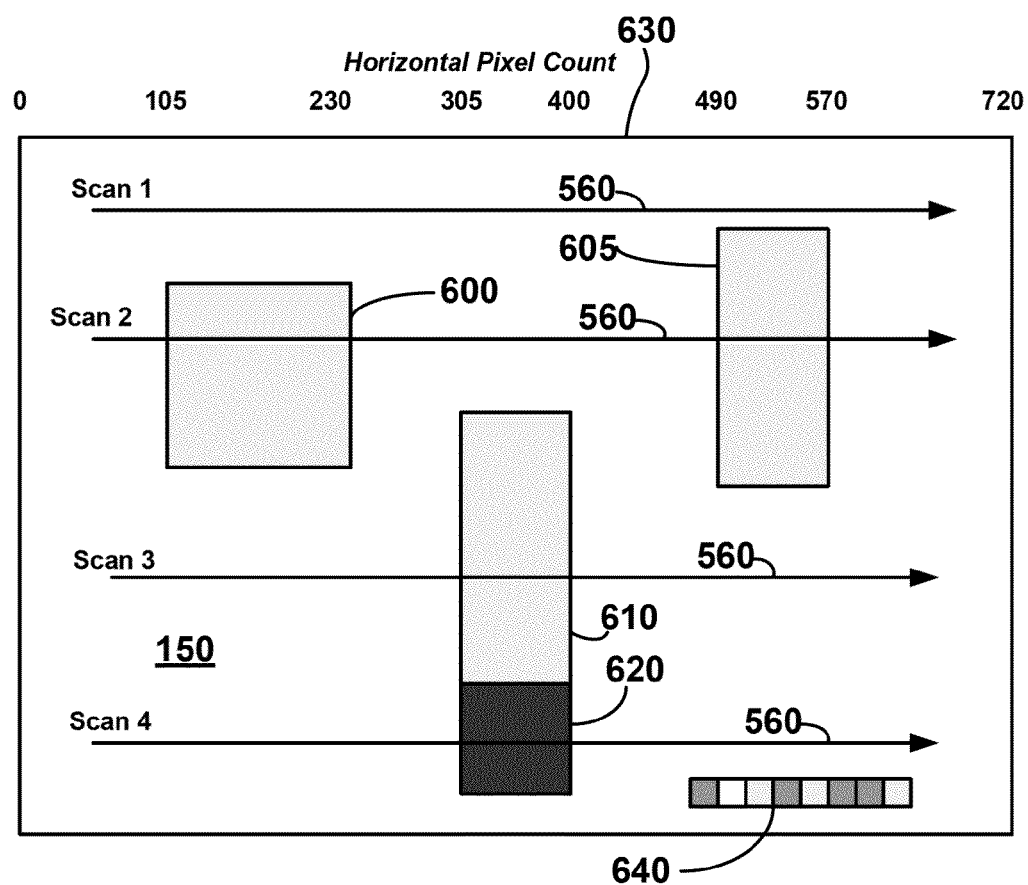
FIG. 10 shows an exemplary embodiment where a frame identifier is used to pull up a template for the unique frame which identifies where in the frame the uniform background is located.

FIG. 10 shows another exemplary embodiment. In this embodiment, each frame has a unique identifier such as the bit counter 640 in which the unique frame identifier is determined by light and dark shades for binary 1 and 0 values. For this example, bit counter 640 is eight bits allowing 256 unique frames to be identified; any length of counter could be equivalently implemented. In FIG. 10, the horizontal pixel count 630 is shown at the top of the frame and in this case goes from 0 to 720 pixels.

When a unique frame is identified using the bit counter 640, a template for this unique frame is called up from the computer memory. The template defines where the uniform background 150 is on a line by line basis or alternatively, defines where the non background objects such as 600, 605 and 610 are located also on a line by line basis.

As an example, one embodiment of the template for the frame shown in FIG. 10 might be:

Frame number (from bit counter 640) 10010110 binary=150 decimal.
Scan 1 0:720
Scan 2 0:105, 235:490, 575:720
Scan 3 0:305, 400:720
Scan 4 0:720

In this template, if we examine the template information for line 2, it says to look at the pixels between 0 to 105, 235 to 490 and the 575 to 720. Note that this scan would skip the pixels in the object 600 which are between pixel counts 105 to 230 and also skip the pixels for object 605 which are between pixel counts 490 to 570.

For pixels which the template indicates to scan and examine, we expect on a good frame that the pixels will have the value of background 150. If, for example, the background value is 90% white, we could set the quality criteria as being that the background pixels are 90% white +/−5%, or any other range. If a pixel identified as background 150 by the template file shows a value outside of this range, it would be considered an error.

An example of an error distortion is shown for object 610. For this object 610, an error distortion 620 is shown at the bottom of the object 610. Scan 4 indicated that all the pixels between 0 to 720 should be background 150. However, as the scan went through pixels 305 to 400, the pixels examined would not be the value of the background 150 and the error distortion 620 would be identified.

As the frame is filled with more objects such as 600, 605 and 610 in this example, the area of the background 150 decreases. This results in fewer pixels being examined with the benefit of the frame evaluation being completed in a shorter amount of time. For example, if the total area of the objects is 50% of the frame, the pixels of the frame which need to be examined is reduced to 50% of the total.

We can see that the template method allows the objects 600, 605, 610 to move from frame to frame since there is a unique template for each frame which identifies the location of the objects. Also, the pixels content inside the objects 600, 605, 610 does not matter for the error analysis and can change from frame to frame. The size and shape of the objects 600, 605, 610 can also vary from frame to frame since as just mentioned, since the unique template for each frame gives the location of the objects for each line identified in the template.

In the example shown in FIG. 10, the template only had four scan lines. The template for each frame could include the scan lines to include all the lines in the frame or any portion of the total. The template for each frame could also indicate different test criteria for different areas in the frame. For example, another possibility for the template for frame 150 shown in FIG. 10 could be:

Scan 1 BG (0:720)
Scan 2 BG (0:105), OBJ1(106:230), BG(235:490), OBJ2 (491:570), BG(575:720)
Scan 3 BG(0:305), OBJ3(306:400), BG(405:720)
Scan 4 BG(0:720)

In the above template example, BG represents the background 150, OBJ1 represents the object 600, OBJ2 represents the object 605 and OBJ3 represents the object 610. Taking a look at line Scan 2, the template tells the process that pixels 0 to 105 are background 150, pixels 106 to 230 are object 600, pixels 235 to 490 are background 150, pixels 491 to 570 are object 605 and pixels 575 to 720 are background 150. The analysis can then use different pass/fail criteria for each of the different pixels along the line scan.

Also with the embodiments mentioned where we are sampling only the background 150, we are looking for distortions in the background 150 pixels values and we can define minimum size errors that will always be found. For example, if we say the minimum size error we always want to find is six by six pixels, it may be adequate to only scan every fifth line and every fifth pixel in that line. This would result in only looking at ⅕₂₅ of the total pixels in the frame in this example, thereby conserving time and processing resources.

Figure 11:
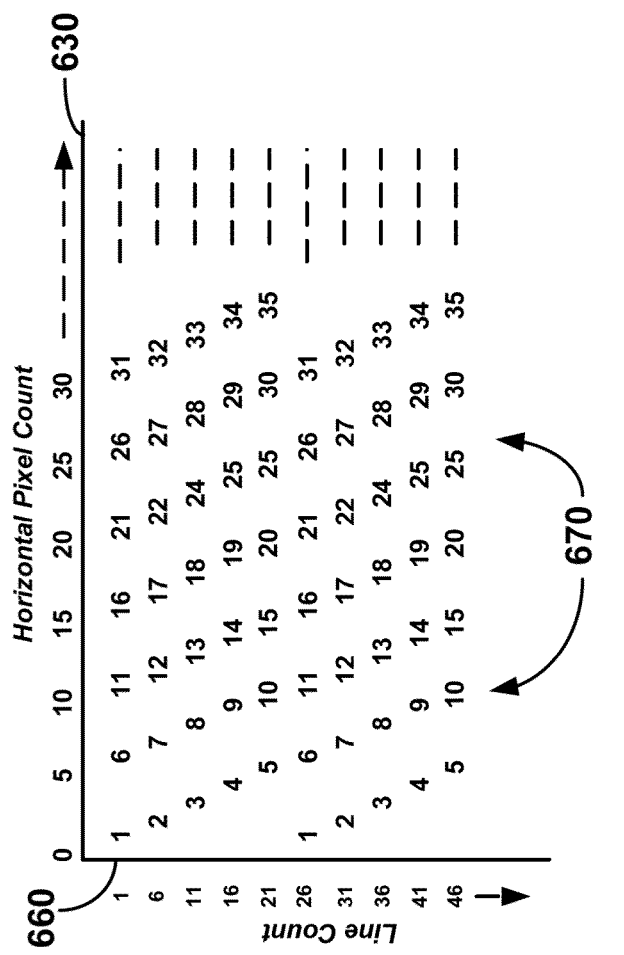
FIG. 11 shows an exemplary line sampling sequence for limited sampling and a sequencing offset for the pixel counting.

Further embodiments could allow non-square shape errors to always be detected. In FIG. 11, an exemplary scan of every fifth line and every fifth pixel is illustrated, with the starting pixel for each scan offset by one count for each new line. In the example of FIG. 11, the Horizontal Pixel Count 630 is in the horizontal dimension and the Line Count 660 is in the vertical dimension. The actual pixel number 670 can be seen to increment by five counts for each sample but there is a one count offset for each subsequent line. After five lines, the offset loops back to zero and the pattern repeats.

For this case of sampling every fifth pixel and every fifth line but with a sequential offset, the 6 by 6 pixel size distortion can still be detected, as can a distortion of 1 by 25 pixels, 2 by 20 pixels and so on.

Figure 12:
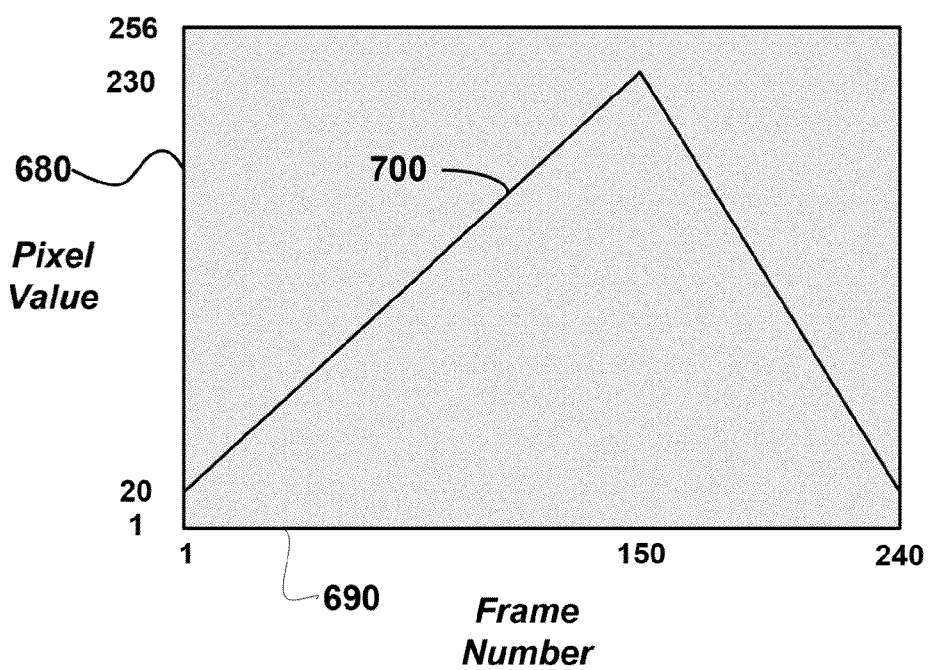
FIG. 12 shows a background value that can change from frame to frame over the video sequence.

In an additional embodiment, the background 150 can be varied from frame to frame. In FIG. 12, the frame number 690 is shown on the horizontal dimension and the pixel value 680 is shown in the vertical dimension. Note that in FIG. 12, the pixel value is given as a single number (full scale of 256 in this case) however the pixel value could be a three value RGB number. In this example, Frame 1 has a background pixel value of 20, and the background pixel value follows the curve 700 such that for frame 150, the pixel value is 240 and then at frame 240, the background 150 pixel value is again 20. The analysis can use any of the methods previously described for finding errors such as a pixel value distortion in the background 150. If the frame has a frame counter which allows the frame to be uniquely identified such as 640 in FIG. 10 and there is a unique template for each frame, the template could include a value for the background 150 for the particular frame. Also, the background 150 value could also be determined by sampling several pixels in areas of the frame known to contain only background. A distortion in the area where the pixels are picked up to determine background would either result in some of the sampled pixels being different values or would result in the rest of the background 150 pixels not matching the sampled pixels.

The exemplary concept of FIG. 12 could simply be used to implement a background 150 that varies between shades of white to shades of black with no moving objects in the visible portion of the screen. The concept of FIG. 12 could also be used to have different background levels in different portions of the video frame. The frame template could be used to indicate what the background 150 value was on a line by line basis and even could show background value 150 changing along the line in a linear dimension. Many other enhancements and variations could be incorporated into any number of alternate but equivalent embodiments.

It should now be appreciated that the foregoing discussion provides advantageous methods and apparatus for measuring the quality of a received video without the need for an external video reference or to pass qualification information in a data stream which is not part of the normal displayed video signal. Alternate and/or additional benefits may be obtained from any number of equivalent variations on the general concepts described herein.

As used herein, the word "exemplary" means "serving as an example, instance, or illustration." Any implementation described herein as "exemplary" is not necessarily intended to be construed as preferred or advantageous over other implementations.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

What is claimed is:

1. A method to identify video decoding errors in an output stream of motion video produced by a video device, the method comprising:
   receiving the output stream of motion video from the video device, wherein the output stream comprises a plurality of output frames each produced by the video device in response to a predetermined input, and wherein each frame of the plurality of output frames comprises a frame identifier and at least one object presented on a consistent background, wherein an expected location of the at least one object varies from frame to frame;
   for each of the plurality of output frames, associating the output frame with a frame template based upon the frame identifier, wherein the frame template defines an expected location of the at least one object within the output frame, and verifying that all of the pixels of the output frame located outside of the expected location of the at least one object conform to the consistent background so that all of the pixels of the at least one object lie within the expected location defined by the frame template.

2. The method of claim 1 further comprising indicating a video decoding error when at least one of the plurality of pixels lying within the output frame and outside of the expected location of the at least one object does not conform to the consistent background.

3. The method of claim 1 wherein the consistent background is defined by pixels having a substantially constant pixel value.

4. The method of claim 3 wherein none of the pixels lying within the at least one object has a pixel value that is equal to the substantially constant pixel value.

5. The method of claim 1 wherein the at least one object is unchanging from frame to frame, but is presented at a different location in each frame.

6. The method of claim 1 wherein the frame identifier visually represents a binary number that associates the output frame with the frame template, and wherein the frame identifier is displayed as part of the output frame.

7. The method of claim 1 wherein each of the frame templates comprises a plurality of pixels each having a pixel value, and wherein the total of all the pixel values for each template is substantially the same as the totals of the other templates.

8. The method of claim 1 wherein each of the frame templates comprises a plurality of pixels each having a pixel value, wherein one of the pixel values is associated with the consistent background, and wherein the number of pixels having the pixel value associated with the consistent background is substantially the same in each of the frame templates.

9. The method of claim 1 further comprising scanning a line of pixels in each of the output frames and determining that a video decoding error exists if a number of consecutive pixels having pixel values that differ from the consistent background is less than a minimum length.

10. The method of claim 1 further comprising scanning a line of pixels in each of the output frames and determining that a video decoding error exists if a number of consecutive pixels having pixel values that differ from the consistent background is greater than a maximum length.

11. A system to identify video decoding errors produced by a video device under test, the system comprising:

a video digitizer configured to receive an output stream of motion video from the video device under test, wherein the output stream comprises a plurality of output frames each produced by the video device in response to a predetermined input, and wherein each of the plurality of output frames comprises a frame identifier and at least one object presented on a consistent background so that the same at least one object is present in each of the plurality of output frames, but in expected locations that vary from frame to frame; and a frame analyzer comprising a processor, wherein the frame analyzer is configured to associate, for each of the plurality of output frames, the output frame with a frame template based upon the frame identifier, wherein the frame template defines the expected location of the at least one object within the output frame, to verify that the pixels of the output frame lying outside of the expected location of the at least one object defined in the template conform to the consistent background, and to provide an output that indicates when pixels of the output frame lying outside the expected location of the at least one object do not conform to the consistent background.

12. The system of claim 11 further comprising a video spooler configured to provide the predetermined input to the video device under test, wherein the predetermined input is a video distribution that represents a plurality of video frames represented by the frame templates.

13. The system of claim 11 wherein the at least one object is unchanging from frame to frame, but is presented at a different location in each frame.

14. The system of claim 11 wherein each of the frame templates comprises a plurality of pixels each having a pixel value, and wherein the total of all the pixel values for each template is substantially the same as the totals of the other templates.

15. The system of claim 11 wherein each of the frame templates comprises a plurality of pixels each having a pixel value, wherein one of the pixel values is associated with the consistent background, and wherein the number of pixels having the pixel value associated with the consistent background is substantially the same in each of the frame templates.

16. A method executable by a video analyzer device to determine decoding errors contained in video frames generated by video hardware under test, the method comprising:

receiving, at the video analyzer device, the output video frames generated by the video hardware under test, wherein each output video frame comprises at least one object presented at a location within the frame on a consistent background, wherein the location of the at least one object varies from frame to frame;

determining, for each of the received output frames, one of a plurality of templates that is associated with the output frame based upon a frame identifier contained within the visual imagery of the output frame, wherein the frame template defines an expected location of the at least one object within the output frame;

comparing, for each of the received output frames, the received output frame to the frame template that is associated with the output frame to verify that the pixels in the output frame lying outside of the expected location defined in the frame template are consistent with the consistent background; and identifying a decoding error if the comparing identifies pixels lying outside of the expected location of the at least one object that are not consistent with the background.

17. The method of claim 16 further comprising applying a video distribution to the video hardware under test, wherein the video distribution is based upon the templates.

18. The method of claim 16 wherein each of the frame templates comprises a plurality of pixels each having a pixel value, and wherein the total of all the pixel values for each template is substantially the same as the totals of the other templates.

19. The method of claim 16 wherein each of the frame templates comprises a plurality of pixels each having a pixel value, wherein one of the pixel values is associated with all of the pixels in the backgrounds of the frame templates.

20. The method of claim 19 wherein the number of pixels having the pixel value associated with the consistent background is substantially the same in each of the frame templates.

* * * * *